(12) United States Patent
Zhang et al.

(10) Patent No.: US 11,972,638 B2
(45) Date of Patent: Apr. 30, 2024

(54) FACE LIVING BODY DETECTION METHOD AND APPARATUS, DEVICE, AND STORAGE MEDIUM

(71) Applicant: Tencent Technology (Shenzhen) Company Limited, Shenzhen (CN)

(72) Inventors: Jian Zhang, Shenzhen (CN); Jia Meng, Shenzhen (CN); Taiping Yao, Shenzhen (CN); Ying Tai, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 366 days.

(21) Appl. No.: 17/513,731

(22) Filed: Oct. 28, 2021

(65) Prior Publication Data

US 2022/0083795 A1    Mar. 17, 2022

Related U.S. Application Data

(63) Continuation of application No. PCT/CN2020/116507, filed on Sep. 21, 2020.

(30) Foreign Application Priority Data

Oct. 18, 2019    (CN) .......................... 201910996055

(51) Int. Cl.
*G06V 40/40* (2022.01)
*G06V 10/56* (2022.01)
*G06V 10/94* (2022.01)
*G06V 20/64* (2022.01)
*G06V 40/16* (2022.01)

(52) U.S. Cl.
CPC .............. *G06V 40/45* (2022.01); *G06V 10/56* (2022.01); *G06V 20/64* (2022.01); *G06V 40/171* (2022.01); *G06V 40/172* (2022.01); *G06V 10/95* (2022.01)

(58) Field of Classification Search
CPC ...... G06V 40/45; G06V 40/71; G06V 40/172; G06V 40/16; G06V 40/68; G06V 10/56; (Continued)

(56) References Cited

U.S. PATENT DOCUMENTS 10,360,464 B1    7/2019  McKay et al.
2018/0173979 A1*  6/2018  Fan ...................... G06V 40/172
(Continued)

FOREIGN PATENT DOCUMENTS

CN    105320947 A    2/2016
CN    105574509 A    5/2016
(Continued)

OTHER PUBLICATIONS

Tencent Technology, ISR, PCT/CN2020/116507, Dec. 21, 2020, 2 pgs.
Tencent Technology, WO, PCT/CN2020/116507, Dec. 21, 2020, 5 pgs.
Tencent Technology, IPRP, PCT/CN2020/116507, Apr. 19, 2022, 6 pgs.
(Continued)

*Primary Examiner* — Edward F Urban
*Assistant Examiner* — Wassim Mahrouka
(74) *Attorney, Agent, or Firm* — Morgan, Lewis & Bockius LLP

(57) ABSTRACT

This application provides a face living body detection method performed by a computing device, the method including: obtaining a first face image of a target detection object in a first illumination condition and a second face image of the target detection object in a second illumination
(Continued)

condition, determining a difference image according to the two images, decoupling an object reflectivity and an object normal vector corresponding to the target detection object from a feature map extracted from the difference image, and determining whether the target detection object is a living body according to the object reflectivity and the object normal vector. This method decouples texture information and depth information of a face, and performs living body detection by using decoupled information, which increases the defense capability against 3D attacks, thereby effectively defending against planar attacks and 3D attacks.

20 Claims, 8 Drawing Sheets

(58) Field of Classification Search
CPC ...... G06V 10/95; G06V 10/454; G06V 20/64; G06N 3/045; G06N 3/08; G06Q 20/40145
See application file for complete search history.

(56) References Cited

U.S. PATENT DOCUMENTS

| | | |
|---|---|---|
| 2018/0204111 A1 | 7/2018 | Zadeh et al. |
| 2019/0258251 A1 | 8/2019 | Ditty et al. |

FOREIGN PATENT DOCUMENTS

| | | |
|---|---|---|
| CN | 107169405 A | 9/2017 |
| CN | 110765923 A | 2/2020 |
| JP | 2018200640 A | 12/2018 |

OTHER PUBLICATIONS

Tencent Technology (Shenzhen) Company Limited, Decision to Grant a Patent, JP 2022-515568, Mar. 13, 2023, 5 pgs.

\* cited by examiner

FACE LIVING BODY DETECTION METHOD AND APPARATUS, DEVICE, AND STORAGE MEDIUM

CROSS-REFERENCE TO RELATED APPLICATIONS

This application is a continuation application of PCT Patent Application No. PCT/CN2020/116507, entitled "FACE LIVENESS DETECTION METHOD, APPARATUS AND DEVICE, AND STORAGE MEDIUM" filed on Sep. 21, 2020, which claims priority to Chinese Patent Application No. 201910996055.5, filed with the State Intellectual Property Office of the People's Republic of China on Oct. 18, 2019, and entitled "FACE LIVING BODY DETECTION METHOD AND APPARATUS, DEVICE, AND STORAGE MEDIUM", all of which are incorporated herein by reference in their entirety.

FIELD OF THE TECHNOLOGY

This application relates to the field of identity authentication technologies, and in particular, to face living body detection.

BACKGROUND OF THE DISCLOSURE

Face living body detection is a key step in a face recognition procedure, and is directly related to security problems of user's identity authentication. With the continuous development, release, and application of face living body detection technologies, increasingly more face living body attacks also emerge continuously, and a demand for high security of face living body detection cannot be met by only defending against attacks of a plane type (screen or paper attacks).

However, the face living body detection technology used in the industry currently is a living body detection algorithm based on depth information of a user's face. The algorithm determines whether a current user is a real person or attacks of planar copies of some papers, photos, or certificates by estimating a depth image of an inputted picture. A main defect of the algorithm is that the algorithm has been proved theoretically that three-dimensional (3D) attacks (for example, a real person wearing a mask or a 3D model) cannot be defended against, which is generally unacceptable for current application scenarios such as payment and access control with a high security requirement.

Based on this, how to provide a face living body detection technology to defend against attacks of a plane type and 3D attacks is a major problem that needs to be resolved urgently in the field of identity authentication.

SUMMARY

Embodiments of this application provide a face living body detection method. The method decouples texture information and depth information from face images in different illumination conditions based on a light reflection principle for face living body detection, thereby effectively defending against 3D attacks and attacks of a plane type. The embodiments of this application further provide a face living body detection apparatus, a device, a computer-readable storage medium, and a computer program product.

According to a first aspect of this application, a face living body detection method is provided, performed by a computing device having an image processing capability, the method including:

obtaining a first face image of a target detection object in a first illumination condition and a second face image of the target detection object in a second illumination condition;

determining a difference image according to the first face image and the second face image;

extracting a feature map from the difference image, and decoupling an object reflectivity corresponding to the target detection object and an object normal vector corresponding to the target detection object from the feature map, the object reflectivity being used for representing texture information, and the object normal vector being used for representing depth information; and determining whether the target detection object is a living body according to the object reflectivity and the object normal vector.

According to a second aspect of this application, a face living body detection model training method is provided, performed by a computing device having an image processing capability, the method including:

obtaining a training data set, each group of training data in the training data set including a sample difference image, a label tag of the sample difference image, and a depth map and a texture map corresponding to the sample difference image, the sample difference image being obtained by performing image difference on face images of a sample detection object acquired in different illumination conditions, the label tag of the sample difference image being used for identifying whether the sample detection object to which the sample difference image belongs is a living body, the depth map being used for identifying depth information of pixel positions in the sample difference image, the texture map being used for identifying material types of the pixel positions in the sample difference image, and the material types being determined based on texture information of the pixel positions;

training a preconstructed first neural network model according to the training data set to obtain a first neural network model in a converged state, the first neural network model including a convolution layer, two deconvolution layers, a global pooling layer, and a fully connected classification layer; and identifying the first neural network model in a converged state to obtain a face living body detection model, the face living body detection model including the convolution layer, the global pooling layer, and the fully connected classification layer.

According to a third aspect of this application, a computing device is provided, including:

a processor and a memory, the memory being configured to store a plurality of computer programs, and the processor being configured to perform the face living body detection method according to the first aspect or the face living body detection model training method according to the second aspect according to the computer programs.

According to a fourth aspect of this application, a non-transitory computer-readable storage medium is provided, configured to store a plurality of computer programs, the computer programs, when executed by a processor of a computing device, being configured to perform the face living body detection method according to the first aspect or the face living body detection model training method according to the second aspect.

As can be seen from the foregoing technical solutions, the embodiments of this application have the following advantages:

When face living body detection is performed, face images of a target detection object in different illumination conditions are first obtained, a feature map is extracted from a difference image formed by the face images in different illumination conditions, an object reflectivity representing texture information and an object normal vector representing depth information are decoupled from the feature map, and face living body detection is performed based on information of two independent dimensions. In this way, the detection accuracy may be improved, and when this detection manner is applicable to a specific face living body detection service scenario, whether a detection object is a real person or an attack of a plane type or a 3D attack may be identified more accurately. Compared with an existing detection method, in this method, whether the target detection object is a living body is determined by combining the texture information and the depth information, thereby having better robustness. In addition, this method uses images formed by light projected to a face of a user in different illumination conditions to perform face living body detection, so that face living body detection may be implemented based on hardware of a mainstream terminal device without extra hardware overhead, and the user does not need to complete an extra specified action, thereby improving the detection efficiency and user experience. In addition, light shining sequences of colors and intensities in different illumination conditions may be considered as active encoding, and an attacker cannot provide an input in a corresponding light in a targeted manner when an encoding manner is unknown, thereby further reducing a probability of being attacked, and improving the detection reliability.

DESCRIPTION OF EMBODIMENTS

Figure 1:
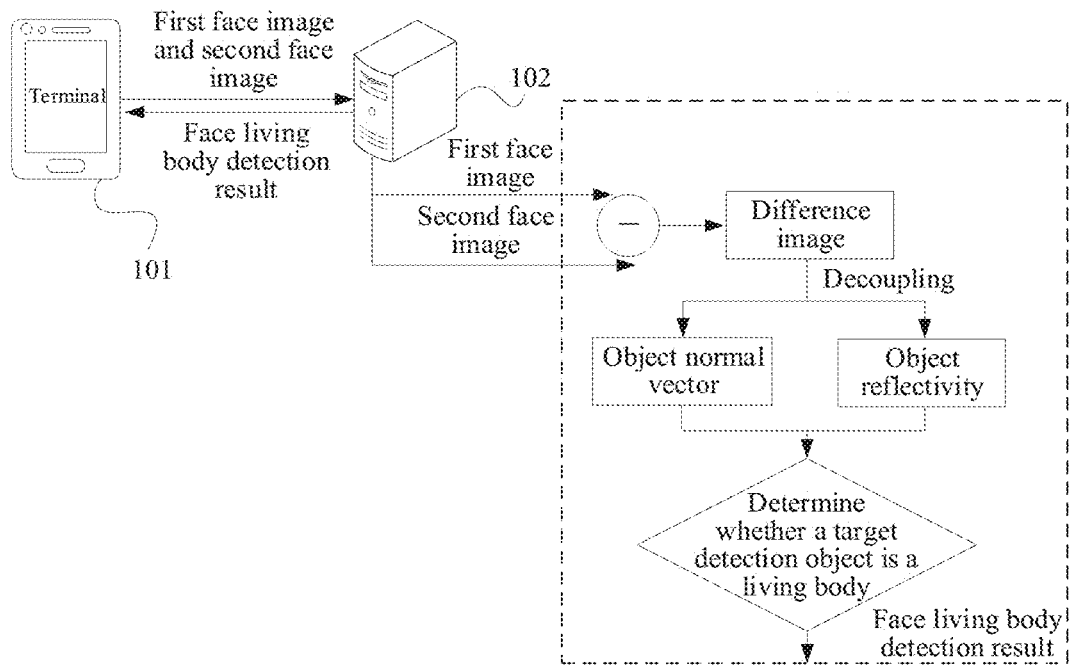
FIG. 1 is a system architecture diagram of a face living body detection method according to an embodiment of this application.

In order to enable a person skilled in the art to better under the solutions of this application, the following clearly and completely describes the technical solutions of the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms such as "first", "second", "third", and "fourth" (if any) in the specification and claims of this application and in the accompanying drawings are used for distinguishing similar objects and not necessarily used for describing any particular order or sequence. It is to be understood that data used in this way is exchangeable in a proper case, so that the embodiments of the present disclosure described herein can be implemented in an order different from the order shown or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV technology is a science that studies how to use a machine to "see", and furthermore, refers to using a camera and a computer to replace human eyes for performing machine vision, such as recognition, tracking, and measurement, on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition. This application mainly uses the image recognition technology in the CV technologies to perform face recognition, and mainly identify whether a face is a real person or an attack type.

For an existing problem that attacks of a plane type and 3D attacks cannot be defended at the same time in an existing face living body detection technology, this application provides a face living body detection method based on a light reflection principle, different face images are formed through reflection of light projected to a face of a user in different illumination conditions, a feature map is extracted from a difference image formed by the different face images, and texture information and depth information are decoupled from the feature map for face living body detection, thereby effectively identifying attacks of a plane type and 3D attacks, and improving the accuracy and security of face living body detection.

It may be understood that the face living body detection method according to this application is applicable to a computing device having an image processing capability. The computing device may be a terminal or a server including a central processing unit (CPU) and/or a graphics processing unit (GPU). For example, the terminal may be a fixed terminal device such as an access control system, a payment system, or a desktop computer, or may be a portable terminal device such as a notebook computer, a tablet computer, or a smartphone, or may be an augmented reality (AR) terminal device or a virtual reality (VR) terminal device. The server may be specifically a computing device providing a face living body detection service, and may be an independent server or a computing cluster formed by a plurality of servers. For ease of understanding, description is made mainly by using an example in which the computing device is a server later.

During actual application, the above face living body detection method may be stored in the computing device in the form of a computer program, and the computing device implements the face living body detection method of this application by executing the computer program. The computer program may be an independent computer program, or may be a functional module, a plug-in, an applet, or the like integrated on another computer program. This is not limited in this embodiment.

It may be understood that, the face living body detection method provided in this application is applicable to an application environment shown in FIG. 1, which is not limited in the embodiments of this application.

As shown in FIG. 1, a face living body detection system is deployed in a terminal 101, and the face living body detection system may be used to acquire face images of a target detection object in different illumination conditions, for example, a first face image of the target detection object in a first illumination condition and a second face image of the target detection object in a second illumination condition. A server 102 obtains the first face image and the second face image from the terminal 101, determines a difference image based on the two face images, extracts a feature map from the difference image, decouples an object reflectivity and an object normal vector corresponding to the target detection object from the feature map, and determines whether the target detection object is a living body according to the object reflectivity and the object normal vector. The server 102 may further return a face living body detection result to the terminal 101 to prompt a user.

To make the technical solutions of this application clearer and easier to understand, the following describes the steps of the face living body detection method provided in the embodiments of this application in detail from the perspective of a server.

Figure 2:
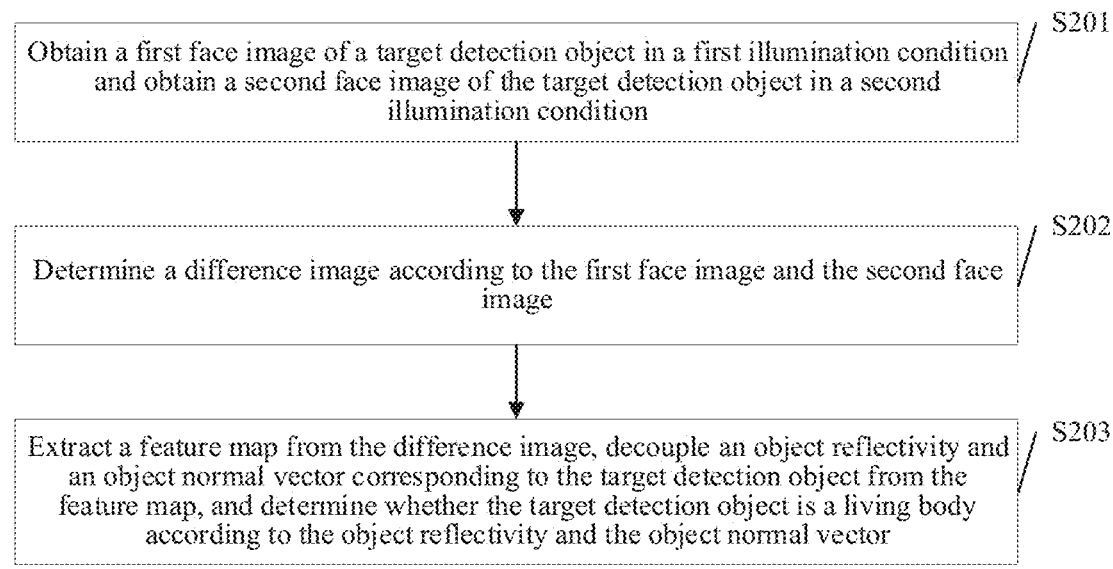
FIG. 2 is a flowchart of a face living body detection method according to an embodiment of this application.

Referring to a flowchart of a face living body detection method shown in FIG. 2, the method includes the following steps:

S201: Obtain a first face image of a target detection object in a first illumination condition and a second face image of the target detection object in a second illumination condition.

An identity of a user generally needs to be verified in many scenarios such as an access control system, a payment application, and a social application. Based on this, the server may verify the identity of the user based on a face image. Considering that lawbreakers may simulate a real person to perform attacks by using a paper with holes, a mask with holes, a silicon mask, or a 3D human head model, the server may obtain face images in different illumination conditions based on a reflection principle and perform face living body detection, to defend against attacks of a plane type or 3D attacks.

The reflection principle refers to that, according to a Lambert illumination model, for some surfaces with relatively complex three-dimensional structures and fine surface texture, when an illumination condition changes, an obtained diffuse light may also change greatly, and images formed by reflected light may also greatly differ from each other. Based on this, in different illumination conditions, different face images may be obtained by photographing the same face.

Figure 3:
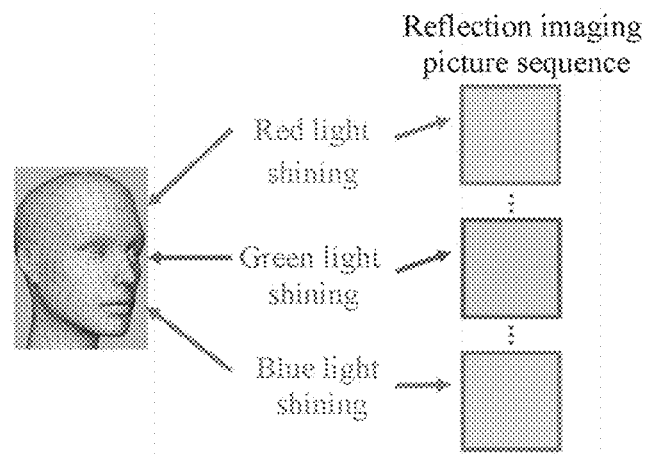
FIG. 3 is a schematic diagram of forming face images in different illumination conditions according to an embodiment of this application.

The illumination condition may be a light shining situation, and may include at least one of illumination parameters such as a light source color, an illumination intensity, and an illumination angle. For example, the different illumination conditions may be light sources with different colors. Referring to FIG. 3, different face images may be formed when a red light, a green light, and a blue light respectively shine on a face, and the face images form a reflection imaging picture sequence. The different illumination conditions may alternatively be two conditions: illumination and non-illumination.

During actual application, the terminal may acquire a first face image in a first illumination condition and a second face image in a second illumination condition of a target detection object, and the server may obtain the first face image and the second face image from the terminal for face living body detection.

The first illumination condition and the second illumination condition may be naturally formed or may be artificially created. For example, the user may artificially adjust at least one of a color, brightness, or a tilt angle displayed by a light emitting component, so as to adjust the light source color, the illumination intensity, and/or the illumination angle, to form the first illumination condition and the second illumination condition. The light emitting component may be located on a display screen or a camera accessory. For example, the light emitting component may be a light-emitting diode.

In a possible implementation, when the user triggers a living body detection operation to cause the terminal to generate a living body detection request, the server may generate an illumination instruction in response to the living body detection request. For example, the illumination instruction may include a first illumination parameter corresponding to the first illumination condition and a second illumination parameter corresponding to the second illumination condition. The server then may control the light emitting component to emit light and acquire facial reflected light of the target detection object based on the illumination instruction to sequentially form the first face image and the second face image.

The illumination parameter may include a light source color, and different light source colors may be reflected by using color identifiers. Therefore, in some possible implementations, the server may randomly select two different color identifiers in response to the living body detection request, and generate an illumination instruction carrying the two different color identifiers. In this way, the light emitting component may be controlled to emit light with different colors according to the illumination instruction carrying the different color identifiers, so as to form different illumination conditions.

Certainly, the foregoing process may be independently implemented by the terminal. For example, when the user triggers a living body detection operation by using the terminal to cause the terminal to generate a living body detection request, the terminal generates an illumination instruction in response to the living body detection request, and emits light according to the illumination instruction, to form corresponding illumination conditions. Certainly, when the server or the terminal generates an illumination instruction, the illumination instruction may be alternatively generated by randomly selecting two different illumination intensities, randomly selecting two different illumination angles, or randomly selecting different combinations of a light source color, a illumination intensity, and/or an illumination angle, to generate an illumination instruction carrying different illumination intensities, an illumination instruction carrying different illumination angles, or an illumination instruction carrying other different illumination parameter combinations. In this way, information entropy of encoding may be added, thereby further improving the security of the face living body detection method.

When face images are formed by acquiring facial reflected light, if a face region is within a finder frame, the facial reflected light may be directly acquired to form the first face image and the second face image. When there is an angle difference between a face and an acquisition device, and the face region is not within or is partially not within the finder frame, to improve the detection accuracy, an angle of the face relative to an image acquisition region (for example, the finder frame) may be further determined in response to the living body detection request. The light emitting component is then controlled according to the illumination instruction and the angle to emit light of the angle sequentially based on the first illumination parameter and the second illumination parameter. In this way, the facial reflected light may be acquired to form the first face image and the second face image.

S202: Determine a difference image according to the first face image and the second face image.

During implementation, the server may perform entire image processing on the first face image and the second face image to obtain a difference image. For example, the server may respectively obtain a pixel sequence of the first face image and a pixel sequence of the second face image, perform a differentiation operation on the pixel sequences according to corresponding channels to obtain a difference pixel sequence, and obtain the difference image based on the difference pixel sequence.

Considering that a face central region greatly affects face detection, the server may alternatively only determine a difference image for the face central region. For example, the server may identify (e.g., crop) a face central region of the first face image to obtain a first face central region image, identify (e.g., crop) a face central region of the second face image to obtain a second face central region image, and perform image difference processing on the first face central region image and the second face central region image to obtain a difference image between the face central regions. In this way, depth information and texture information of the face central region may be focused in subsequent prediction, thereby improving the prediction precision.

Figure 4:
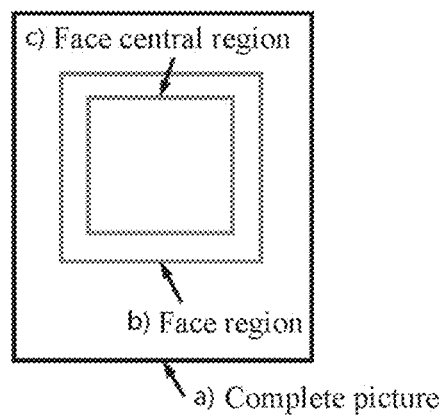
FIG. 4 is a schematic diagram of a face central region image according to an embodiment of this application.

When the face central region is cropped, the server may first identify a face region by using a face recognition model, and then crop the face region. Referring to FIG. 4, after a face image formed through light reflection is obtained, the server performs data preprocessing based on a face recognition result and crops a face central region image. In FIG. 4, a region a) represents a frame of a complete picture, a region b) is a face recognition result, that is, a face region of a high-precision face recognition model, a region c) retracts N pixels internally based on the region b), and an image obtained through, e.g., cropping according to the region c) is a face central region image. N may be set according to an actual requirement, and for example, may be set to 15. When the difference image formed by the face central region images is used as an input of a face living body detection model for training and testing, the face living body detection model may more focus on the depth information and the texture information of the face central region, thereby improving the accuracy of the face living body detection model.

Considering that face detection may be alternatively implemented based on a face local region such as an eye, a nose, a mouth, or other facial features, the server may alternatively determine a difference image for a face local organ region. For example, the server may identify (e.g., crop) a face local organ region of the first face image to obtain a first face local organ region image, identify (e.g., crop) a face local organ region of the second face image to obtain a second face local organ region image, and perform image difference processing on the first face local organ region image and the second face local organ region image to obtain a difference image between the face local organ regions. In this way, the most valuable local region is focused only in subsequent prediction, thereby ensuring the prediction precision and improving the prediction efficiency.

Considering that a nose region has the strongest three-dimensional effect, an information quantity of a difference image corresponding to the nose region is the greatest. The server may crop the nose region from the first face image and the second face image respectively to obtain a corresponding first face local organ region image and a corresponding second face local organ region image, determine the difference image based on the two face local organ region images, and use the difference image for face living body detection, so as to improve the detection accuracy.

In some possible implementations, the server may determine the difference image from a global dimension and a local dimension. For example, a face central region is respectively cropped from the first face image and the second face image to obtain a corresponding first face central region image and a corresponding second face central region image, a face local organ region is respectively cropped from the first face image and the second face image to obtain a corresponding first face local organ region image and a corresponding second face local organ region image, image difference processing is then performed on the first face central region image and the second face central region image to obtain a difference image between the face central regions as a first difference image, and image difference processing is performed on the first face local organ region image and the second face local organ region image to obtain a difference image between the face local organ regions as a second difference image. Double detection is performed based on the difference images of two dimensions, thereby further improving the reliability of a detection result.

S203: Extract a feature map from the difference image, decouple an object reflectivity corresponding to the target detection object and an object normal vector corresponding to the target detection object from the feature map, and determine whether the target detection object is a living body according to the object reflectivity and the object normal vector.

As can be known based on the Lambert illumination model, a difference image of two images of the same object in different illumination conditions includes two major information: an object reflectivity and an object normal vector. Reflectivities corresponding to objects of different materials (or different texture) are different, and directions of normal vectors corresponding to different positions are different. Therefore, the object reflectivity may represent texture information of an object, and the object normal vector may represent depth information of an object. That is, the difference image formed based on the face images in different illumination conditions includes texture information and depth information of a face. The server may extract a feature map from the difference image, and decouple an object reflectivity representing texture information and an object normal vector representing depth information from the feature map for living body detection, thereby preventing the texture information and depth information from being mixed and affecting the precision of face living body detection.

The process of extracting the feature map from the difference image and decoupling the object reflectivity and the object normal vector corresponding to the target detection object from the feature map may be implemented by using a pre-trained face living body detection model. The process of determining whether the target detection object is a living body according to the object reflectivity and the object normal vector corresponding to the target detection object may be also implemented by using the face living body detection model.

It may be understood that, the face living body detection model uses the difference image of the target detection object as an input, and uses a prediction result of whether the target detection object is a living body as an output. The face living body detection model may include a convolution layer, a global pooling layer, and a fully connected classification layer. During implementation, the server may input the difference image into the pre-trained face living body detection model, obtain the feature map by extracting an image feature by using the convolution layer in the face living body detection model, decouple the object reflectivity corresponding to the target detection object and the object normal vector corresponding to the target detection object from the feature map, and determine, by using the global pooling layer and the fully connected classification layer in the face living body detection model, whether the target detection object is a living body according to the object reflectivity and the object normal vector.

The face living body detection model may be obtained through training of a neural network. In an example, the neural network includes a convolution layer, a global pooling layer, and a fully connected classification layer. A sample difference image in training data is inputted into the face living body detection model, the face living body detection model may decouple texture information and depth information by using the convolution layer, determine a face living body detection score corresponding to the sample difference image by using the global pooling layer and the fully connected classification layer based on the texture information and the depth information, determine a prediction result based on the face living body detection score, perform parameter update based on the prediction result and a label tag corresponding to the sample difference image in sample data, stop training when an updated model meets a training stop condition, and use the model meeting the condition for face living body detection. A training process is described below in detail.

Figure 5:
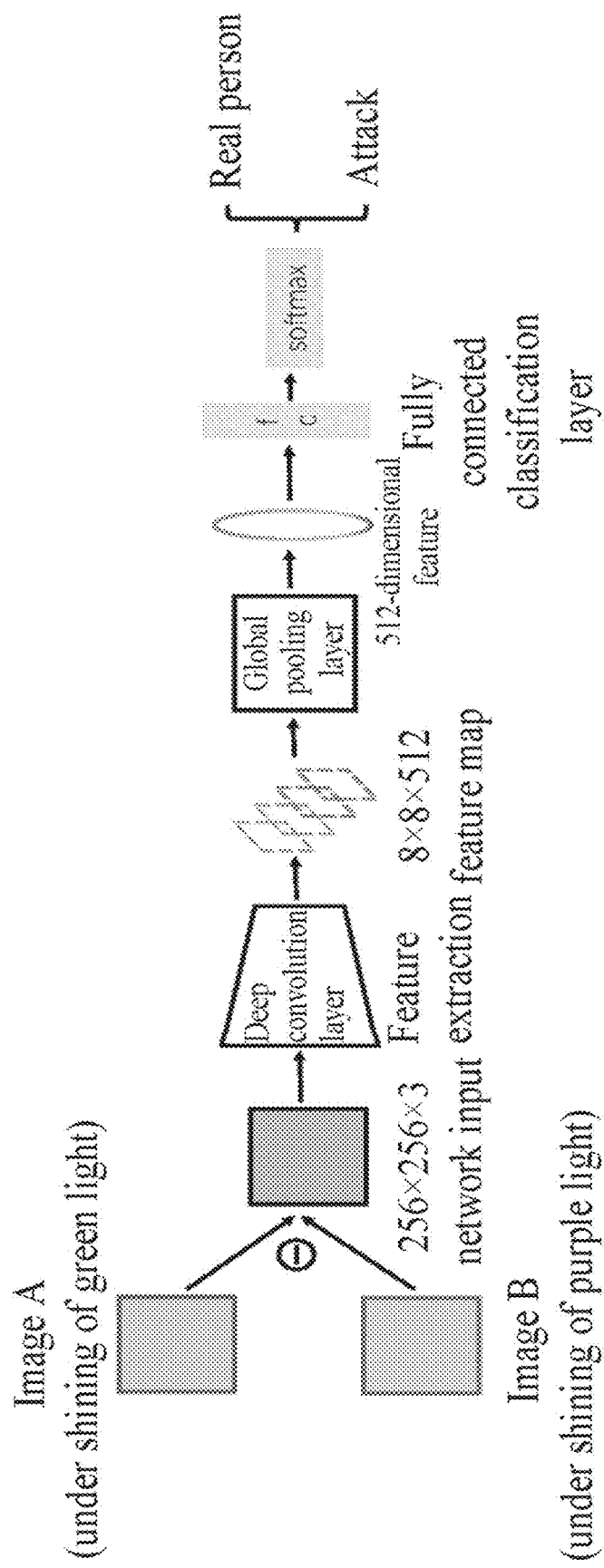
FIG. 5 is a schematic structural diagram of a face living body detection model according to an embodiment of this application.

For ease of understanding, this application further describes an implementation of performing face living body detection on the target detection object in combination with a structure of a face living body detection model. Referring to FIG. 5, light with different colors is emitted to a face by using a display screen of a user end. A first face image (that is, an image A obtained under shining of green light) and a second face image (that is, an image B obtained under shining of purple light) are formed through light reflection, and difference processing is performed on the image A and the image B to obtain a difference image with a size of 256×256×3 as a network input. The difference image is inputted into a face living body detection model, the face living body detection model includes an input layer, a deep convolution layer, a global pooling layer, and a fully connected classification layer. After the difference image is inputted into the model, a feature map with a size of 8×8×512 may be obtained through feature extraction by using the deep convolution layer. A 512-dimensional feature may be obtained by using the global pooling layer, and classification may be then performed by using a softmax function through the fully connected classification layer to obtain a face living body detection score. If the face living body detection score is higher than a preset determination threshold t, the face living body detection model determines the input as a real person, namely, the target detection object is a living body; otherwise, the input is determined as an attack, namely, the target detection object is not a living body and is forged by using a photo or a 3D model.

In the foregoing example, after the face living body detection score is obtained, the server may further perform normalization on the face living body detection score, and compare the normalized face living body detection score with the corresponding threshold, to implement face living body detection.

The preset determination threshold may be set according to an actual requirement. The server may keep both a real person pass rate and an attack rejection rate at a relatively high level by adjusting the preset determination threshold.

In some possible implementations, the face living body detection model may further include two branches: depth map regression and texture map regression. In this way, when the target detection object is determined as an attack, the server may further determine an attack type based on a depth map regression result and a texture map regression result.

Considering that some application scenarios have a higher requirement on the security performance of living body detection, the server may further infer an original illumination condition from the obtained first face image and second face image. If the inferred original illumination condition does not match a light shining sequence code delivered by a backend, it may be considered that a port of a front-end device has been hijacked by other technologies, and inputs within this time period are all considered as attacks.

As can be known from the above, an embodiment of this application provides a face living body detection method, and a face living body detection model is pre-trained based on sample data carrying depth information and texture information as supervision information. The face living body detection model may decouple the depth information and the texture information, and further implement face living body detection based on the depth information and the texture information, so as to identify 2D attacks and 3D attacks accurately. In terms of security performance, modeling based on the light reflection principle and decoupling depth information and texture information from reflection imaging pictures in different illumination conditions are more robust when compared with a living body detection method only using the depth information. In addition, this method can greatly reduce a false pass rate of 3D attacks without affecting identification of other attack types. In terms of user experience, this method does not require any form of user interaction, and face-scan verification may be completed by only maintaining a pose temporarily. In terms of platform and model universality, this method does not require customized hardware, and supports usage of mainstream mobile devices on the market currently and is easy to promote.

It may be understood that, the face living body detection method provided in this application is implemented by using a face living body detection model. For ease of understanding of the technical solutions of this application, a face living body detection model training method provided in this application is described below in detail in combination with a specific embodiment from the perspective of a server.

Figure 6:
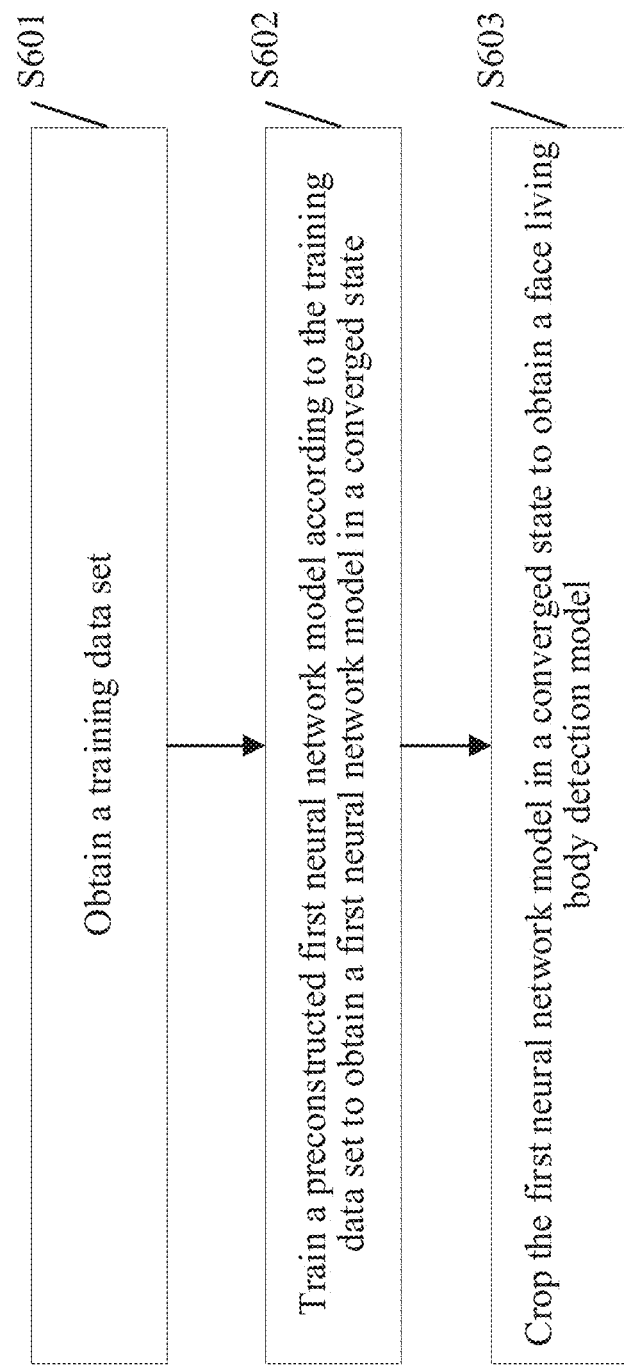
FIG. 6 is a flowchart of a face living body detection model training method according to an embodiment of this application.

Referring to a flowchart of a face living body detection model training method shown in FIG. 6, the method includes the following steps:

S601: Obtain a training data set.

The training data set includes a plurality of groups of training data, each group of training data includes a sample difference image, a label tag of the sample difference image, and a depth map and a texture map corresponding to the sample difference image. The sample difference image is obtained by performing image difference processing on face images of a sample detection object acquired in different illumination conditions, the label tag of the sample difference image is used for identifying whether the sample detection object to which the sample difference image belongs is a living body, the texture map is used for identifying material types of pixel positions in the sample difference image, the material types are determined based on texture information of the pixel positions, the depth map is used for identifying depth information of the pixel positions in the sample difference image, and the depth information may be determined based on a distance between a spatial position of a pixel and an imaging plane.

The sample detection object includes a real person (living body) and an attack sample (non-living body). Training data of which the sample detection object is a real person is referred to as a positive sample, and training data of which the sample detection object is an attack sample is referred to as a negative sample. During actual application, positive samples and negative samples may be configured according to a first preset proportion to form a training data set, where the first preset proportion may be set according to an actual requirement, for example, may be set to 8:2.

Considering the sample diversity, the server may alternatively configure negative samples of different types according to a second preset proportion to form a training data set. For example, the negative samples include planar paper attacks, planar screen attacks, and 3D model attacks, and the second preset proportion may be 1:1:2. In this way, the server may configure the negative samples according to the proportion to form a training data set.

When training data is generated, the server may first obtain a sample difference image, and give different tags such as labels 1 to 5 to the sample difference image based on a real person, a paper, a screen, a 3D model, and an environment, so as to obtain a label tag corresponding to the sample difference image. The server then determines material types of pixel positions based on texture information of the pixel positions of the sample difference image, and may generate a texture map of the sample difference image by giving material type tags to the difference image pixel by pixel. In addition, a depth map is generated for the sample difference image based on a 3D modeling tool, where a depth map of a planar attack is an all-zero grayscale image. Finally, the server may generate training data according to the sample difference image, the label tag, the texture map, and the depth map. The label tag, the texture map, and the depth map are used as supervision information of the training data.

S602: Train a preconstructed first neural network model according to the training data set to obtain a first neural network model in a converged state.

During implementation, the first neural network model may include a convolution layer, two deconvolution layers, a global pooling layer, and a fully connected classification layer. The convolution layer is used for extracting a feature map from a difference image, and decoupling an object reflectivity representing texture information of a sample detection object and an object normal vector representing depth information of the sample detection object from the feature map. The two deconvolution layers are used for restoring a picture based on the object reflectivity and the object normal vector respectively to implement depth regression and texture regression. That is, one deconvolution layer obtains a texture map through regression based on the object reflectivity, and the other deconvolution layer obtains a depth map through regression based on the object normal vector. The global pooling layer is used for performing pooling processing, and the fully connected classification layer is used for performing classification on features on which pooling processing has been performed and predicting whether the sample detection object is a living body according to a classification result.

During actual application, the convolution layer used for extracting depth information and texture information may be a deep convolution layer existing in the industry. For example, the convolution layer may be a convolution layer in a network structure such as VGGNet, ResNet, or DenseNet, and certainly, the network structure may be alternatively autonomously designed or modified according to a solution requirement. Considering the difficulty of a regression task, the deconvolution layer used for restoring a picture may adopt an upsampling model with a skip-connection structure, for example, a deconvolution layer in a network structure such as UNet or Deconvolution with skip-connection. In addition, the global pooling layer and the fully connected classification layer may adopt universal structures in the industry, and details are not described herein again.

When the first neural network model is trained, a corresponding training manner may be selected according to an actual requirement. In some possible implementations, for the preconstructed first neural network model, the server may train a network parameter of the first neural network model according to the training data set based on an end-to-end training manner until a first neural network model in a converged state is obtained, so as to obtain relatively good performance.

Certainly, in some other possible implementations, the server may alternatively train the first neural network model by using a cross training manner. For example, for the preconstructed first neural network model, in a first stage, the global pooling layer and the fully connected classification layer in the preconstructed first neural network model are fixed, and the convolution layer and the two deconvolution layers are trained based on the training data set. In a second stage, the convolution layer and the two deconvolution layers in the first neural network model are fixed, and the global pooling layer and the fully connected classification layer are trained based on the training data set. A first neural network model in a converged state after cross training of the first stage and the second stage is then obtained according to the convolution layer and the deconvolution layers that are trained in the first stage and the global pooling layer and the fully connected classification layer that are trained in the second stage. In this way, the training difficulty may be reduced, and the training efficiency may be improved.

The process of training the first neural network model based on the training data set is described below in detail.

The server may input the sample difference image included in each group of training data in the training data set into the preconstructed first neural network model, perform feature extraction on the sample difference image by using the convolution layer in the first neural network model to obtain a group of feature maps, and decouple the group of feature maps into a first group of feature maps and a second group of feature maps, where the first group of feature maps represents the object normal vector of the sample detection object, and the second group of feature maps represents the object reflectivity of the sample detection object. The object normal vector in the first group of feature maps may be used for regression to obtain a depth map representing depth information, and the object reflectivity in the second group of feature maps is used for regression to obtain a texture map representing texture information.

By using the convolution layer in the first neural network model, the first group of feature maps is then inputted into a first deconvolution layer in the first neural network model, the second group of feature maps is inputted into a second deconvolution layer in the first neural network model, and the group of feature maps is inputted into the global pooling layer in the first neural network model to input the group of feature maps into the fully connected classification layer after being processed by the global pooling layer.

A predicted feature map outputted by the first deconvolution layer is essentially a depth map obtained through regression by the first deconvolution layer based on the first group of feature maps, for ease of description, the depth map is denoted by a predicted depth map, and a depth map loss may be determined by comparing the predicted depth map with a depth map corresponding to a sample image that is labelled in advance. Similarly, a predicted feature map outputted by the second deconvolution layer is essentially a texture map obtained through regression by the second deconvolution layer based on the second group of feature maps, for ease of description, the texture map is denoted by a predicted texture map, and a texture map loss may be determined by comparing the predicted texture map with a texture map corresponding to the sample image that is labelled in advance. In addition, the server may further determine a classification loss according to a predicted tag outputted by the fully connected classification layer and the label tag corresponding to the sample difference image, determine a model loss according to the depth map loss, the texture map loss, and the classification loss determined in each iterative update cycle, and iteratively update a parameter of the first neural network model according to the model loss until the first neural network model is in a converged state.

For ease of understanding, this application further provides an example to describe a process of training a face living body detection model.

Figure 7:
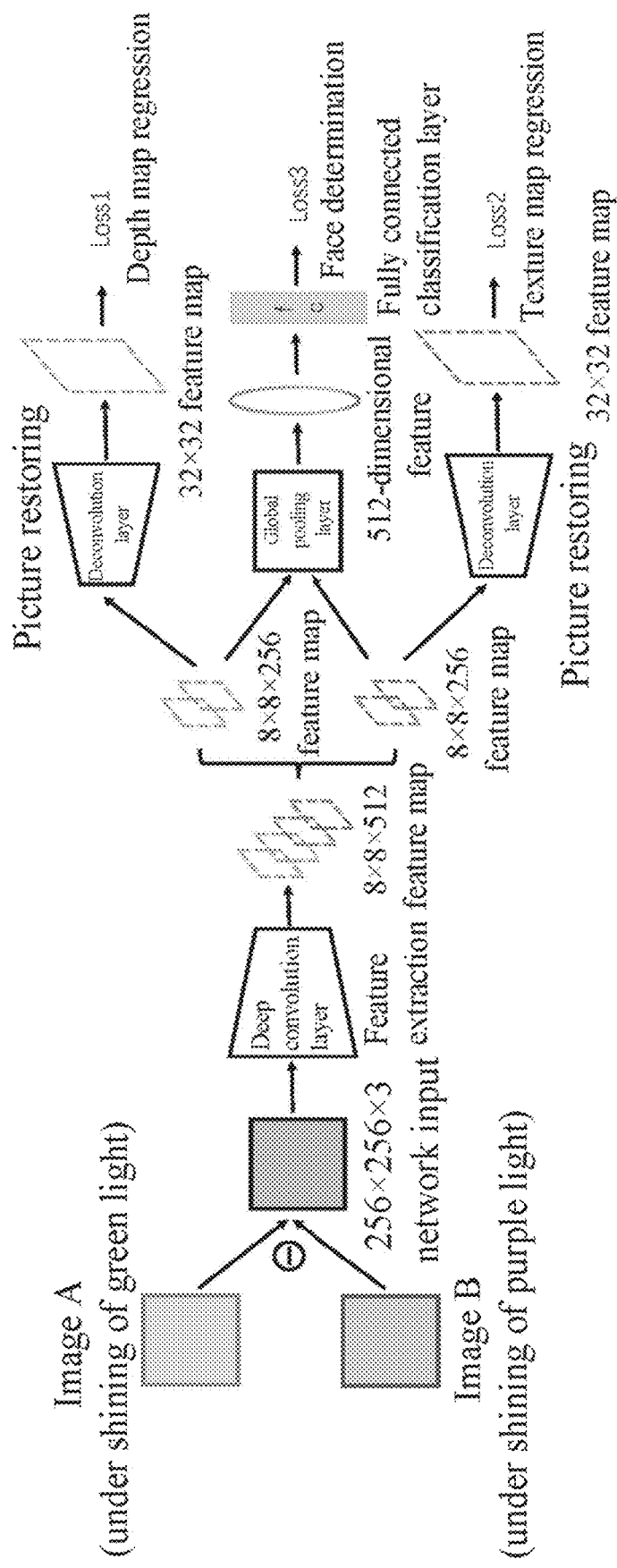
FIG. 7 is a schematic structural diagram of a first neural network model according to an embodiment of this application.

Referring to FIG. 7, the first neural network model includes a deep convolution layer, two deconvolution layers, a global pooling layer, and a fully connected classification layer. A sample difference image formed by face images in different illumination conditions is inputted into the first neural network model, a feature map may be obtained by performing feature extraction by using the deep convolution layer, and feature maps respectively including depth information and texture information may be obtained by decoupling the feature map. The model is then divided into three branches, where one branch restores a picture by using a deconvolution layer based on the feature map including the depth information and then performs depth regression, one branch restores a picture by using a deconvolution layer based on the feature map including the texture information and then performs texture regression, and the remaining one branch performs classification by using the global pooling layer and the fully connected classification layer based on the feature map including the depth information and the feature map including the texture information, and predicts whether the sample detection object is a real person or an attack type.

In the foregoing example, each branch of the first neural network model is provided with a corresponding loss function, namely, loss1 to loss3 in the figure. The server performs forward calculation on each group of training data (mini-batch) to obtain a loss value, and then updates the model parameter by using a stochastic gradient descent (SGD) algorithm or another optimization algorithm according to loss value. The first neural network model may be optimized through continuous iterative update, and when the updated first neural network model is in a converged state, the server may stop training. In the training process, the server may perform model selection according to a validation set and prevent model overfitting by using other technical means.

S603: Crop the first neural network model in a converged state to obtain a face living body detection model.

Considering that the face living body detection model is mainly configured to detect whether the target detection object is a real person or an attack, during actual application, the server may remove the two branches used for depth regression and texture regression from the first neural network model to obtain a face living body detection model, and the face living body detection model includes the convolution layer, the global pooling layer, and the fully connected classification layer.

Certainly, when there is a requirement for determining an attack type, the server may alternatively reserve the two branches for depth regression and texture regression for determining the attack type based on the depth information and the texture information.

As can be known from the above, an embodiment of this application provides a face living body detection model training method, a training data set is first obtained, and a depth map and a texture map are further added as supervision information of a sample difference image on the basis of a label tag in each group of training data in the training data set. The texture map is used for performing supervised learning on the performance of extracting texture information of a model, and the depth map is used for performing supervised learning on the performance of extracting depth information of the model. In this way, a trained model has functions of accurately extracting depth information and texture information, thereby improving the prediction accuracy of a face living body detection model.

In the embodiment shown in FIG. 6, when the training data set is obtained, the server may also perform further processing on the face images in different illumination conditions to obtain a sample difference image, to further obtain training data.

In some possible implementations, the server may perform face recognition on the face images in different illumination conditions, perform identification (e.g., via cropping) based on a face recognition result to obtain face central region images, and then perform image difference processing on the face central region images to obtain a difference image between the face central regions as the sample difference image. In this way, depth information and texture information of the face central region may be more focused in subsequent prediction, thereby improving the prediction precision.

In some other possible implementations, the server may perform face recognition on the face images in different illumination conditions, crop a face local organ region based on a face recognition result to obtain face local organ region images, and perform image difference processing on the face local organ region images to obtain a difference image between the face local organ regions as the sample difference image. In this way, a valuable face local organ region may be focused only in subsequent prediction, thereby ensuring the prediction precision and improving the prediction efficiency.

Certainly, the server may alternatively perform double detection based on the difference image between the face central regions and the difference image between the face local organ regions. Correspondingly, the server may train two models, where one model is configured to perform prediction based on the face central region, and the other model is configured to perform prediction based on the face local organ region such as a nose region, thereby improving the detection accuracy.

For example, the server obtains a first training data set and a second training data set, where a sample difference image included in each group of training data in the first training data set is obtained by performing image difference processing based on face central regions of two images corresponding to a sample detection object in different illumination conditions, and a sample difference image included in each group of training data in the second training data set is obtained by performing image difference processing based on face local organ regions of two images corresponding to the sample detection object in different illumination conditions. The server then trains a preconstructed first neural network model according to the first training data set and the second training data set in parallel, to obtain two first neural network models in a converged state.

In this way, the server crops the two first neural network models in a converged state, and uses the two cropped first neural network model as face living body detection models.

The server in the embodiment shown in FIG. 2 and the server in the embodiment shown in FIG. 6 may be the same or may be different. That is, the server in a training process and the server in a prediction process may be the same or may be different, which may be set according to an actual requirement.

In order to make the technical solutions of this application clearer, the following describes the face living body detection method provided in this application in combination with an application scenario of identity authentication in mobile payment.

Figure 8:
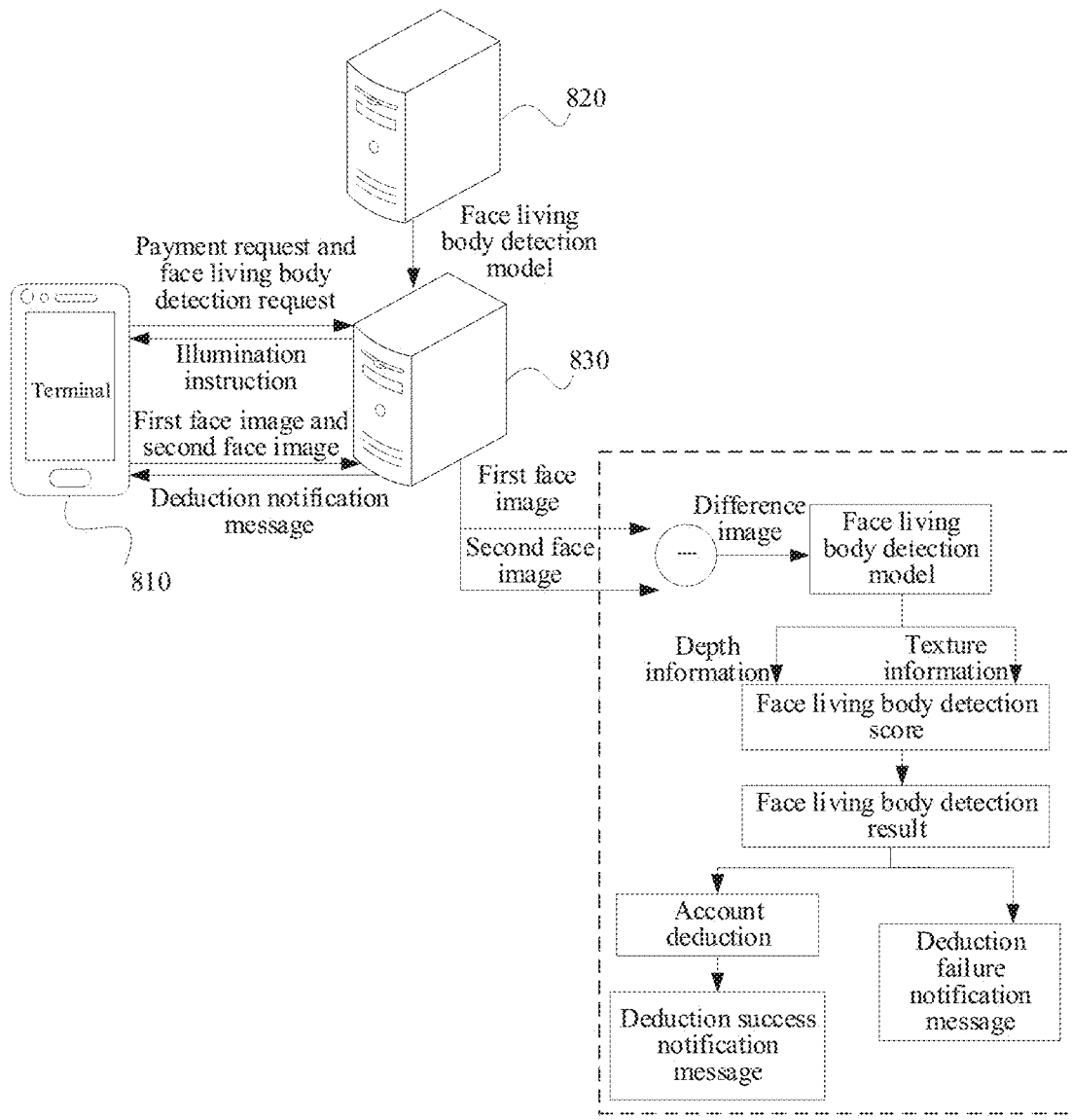
FIG. 8 is a schematic diagram of an application scenario of a face living body detection method according to an embodiment of this application.

Referring to a schematic diagram of a scenario of a face living body detection method shown in FIG. 8, this scenario includes a terminal 810, a training server 820, and a payment server 830. A payment application is installed on the terminal 810, a user may initiate a payment operation by using the payment application on the terminal 810, and the terminal 810 may transmit a payment request to the payment server 830 in response to the payment operation. The payment server 830 first performs identity authentication on the user based on a face living body detection model trained by the training server 820, then performs account deduction according to the payment request after the authentication succeeds, and returns a deduction notification message to the terminal 810 to prompt the user whether payment succeeds.

A process that the payment server 830 performs identity authentication based on a face living body detection model includes the following:

First, when the payment request is generated, the terminal 810 triggers to generate a face living body detection request at the same time, and the terminal 810 then transmits the face living body detection request to the payment server 830. The payment server 830 randomly selects two different color identifiers such as red and green in response to face living body detection request, generates an illumination instruction carrying the two different color identifiers, and transmit the illumination instruction to the terminal 810.

The terminal 810 controls a display screen to emits light with corresponding colors sequentially under the indication of the illumination instruction according to the two different color identifiers, and acquires facial reflected light of the user to sequentially form a first face image and a second face image, and then transmits the first face image and the second face image to the payment server 830.

The payment server 830 performs face recognition on the first face image and the second face image respectively, acquires a face central region according to a face recognition result to obtain a first face central region image and a second face central region image, and performs image difference processing on the first face central region image and the second face central region image to obtain a difference image between the face central regions.

The payment server 830 inputs the difference image into the face living body detection model obtained from the training server 820, extracts a feature map from the difference image by using the face living body detection model, decouples an object reflectivity representing texture information and an object normal vector representing depth information from the feature map, determines a face living body detection score corresponding to the difference image according to the object reflectivity and the object normal vector, and compares the face living body detection score with a preset determination threshold. If the face living body detection score is higher than the preset determination threshold, it is determined that a face living body detection result is a real person, the identity authentication on the user succeeds, the payment server 830 may continue to perform an account deduction operation, and transmit a deduction success notification message to the terminal 810 after deduction succeeds to prompt the user that payment succeeds; otherwise, it is determined that the face living body detection result is an attack, the payment server gives up performing the account deduction operation, and transmits a deduction failure notification message to the terminal 810 to prompt the user that payment fails.

The above is some implementations of the face living body detection method and the face living body detection model training method provided in the embodiments of this application, and this application further provides corresponding apparatuses based on this. The following describes the apparatuses provided in the embodiments of this application from the perspective of function modularization.

Figure 9:
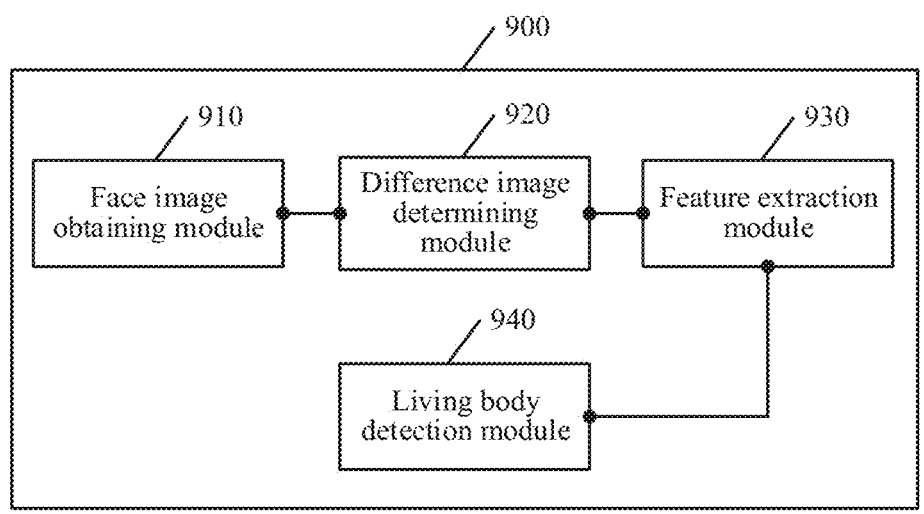
FIG. 9 is a structural diagram of a face living body detection apparatus according to an embodiment of this application.

Referring to a schematic structural diagram of a face living body detection apparatus 900 shown in FIG. 9, the apparatus 900 includes:

a face image obtaining module 910, configured to obtain a first face image of a target detection object in a first illumination condition and a second face image of the target detection object in a second illumination condition;

a difference image determining module 920, configured to determine a difference image according to the first face image and the second face image;

a feature extraction module 930, configured to extract a feature map from the difference image, and decouple an object reflectivity corresponding to the target detection object and an object normal vector corresponding to the target detection object from the feature map, the object reflectivity being used for representing texture information, and the object normal vector being used for representing depth information; and a living body detection module 940, configured to determine whether the target detection object is a living body according to the object reflectivity and the object normal vector.

In some embodiments, the difference image determining module 920 is specifically configured to:

crop a face central region of the first face image to obtain a first face central region image, and crop a face central region of the second face image to obtain a second face central region image; and perform image difference processing on the first face central region image and the second face central region image to obtain a difference image between the face central regions.

In some embodiments, the difference image determining module 920 is specifically configured to:

identify (e.g., crop) a face local organ region of the first face image to obtain a first face local organ region image, and identify (e.g., crop) a face local organ region of the second face image to obtain a second face local organ region image; and perform image difference processing on the first face local organ region image and the second face local organ region image to obtain a difference image between the face local organ regions.

In some embodiments, the difference image determining module 920 is specifically configured to:

identify (e.g., crop) a face central region of the first face image to obtain a first face central region image, and identify (e.g., crop) a face central region of the second face image to obtain a second face central region image;

perform image difference processing on the first face central region image and the second face central region image to obtain a difference image between the face central regions;

identify (e.g., crop) a face local organ region of the first face image to obtain a first face local organ region image, and identify (e.g., crop) a face local organ region of the second face image to obtain a second face local organ region image; and perform image difference processing on the first face local organ region image and the second face local organ region image to obtain a difference image between the face local organ regions.

In some embodiments, the feature extraction module 930 is specifically configured to:

extract a feature map from the difference image by using a pre-trained face living body detection model, and decouple the object reflectivity corresponding to the target detection object and the object normal vector corresponding to the target detection object from the feature map; and the living body detection module 940 is specifically configured to:

determine, by using the face living body detection model, whether the target detection object is a living body according to the object reflectivity and the object normal vector.

In some embodiments, the feature extraction module 930 is specifically configured to:

input the difference image into a pre-trained face living body detection model, obtain the feature map by extracting an image feature by using a convolution layer in the face living body detection model, and decouple the object reflectivity corresponding to the target detection object and the object normal vector corresponding to the target detection object from the feature map; and the living body detection module 940 is specifically configured to:

determine, by using a global pooling layer and a fully connected classification layer in the face living body detection model, whether the target detection object is a living body according to the object reflectivity and the object normal vector.

In some embodiments, the face image obtaining module 910 is specifically configured to:

generate an illumination instruction in response to a living body detection request, the illumination instruction including a first illumination parameter corresponding to the first illumination condition and a second illumination parameter corresponding to the second illumination condition; and control a light emitting component to emit light and acquire facial reflected light of the target detection object based on the illumination instruction to sequentially form the first face image and the second face image.

In some embodiments, when generating an illumination instruction, the face image obtaining module 910 is specifically configured to:

select two different color identifiers randomly in response to the living body detection request to generate an illumination instruction carrying the two different color identifiers.

In some embodiments, when controlling a light emitting component to emit light and acquiring facial reflected light of the target detection object based on the illumination instruction to sequentially form the first face image and the second face image, the face image obtaining module 910 is specifically configured to:

determine an angle of a face relative to an image acquisition region in response to the living body detection request; and control, according to the illumination instruction and the angle, the light emitting component to emit light of the angle sequentially based on the first illumination parameter and the second illumination parameter.

Figure 10:
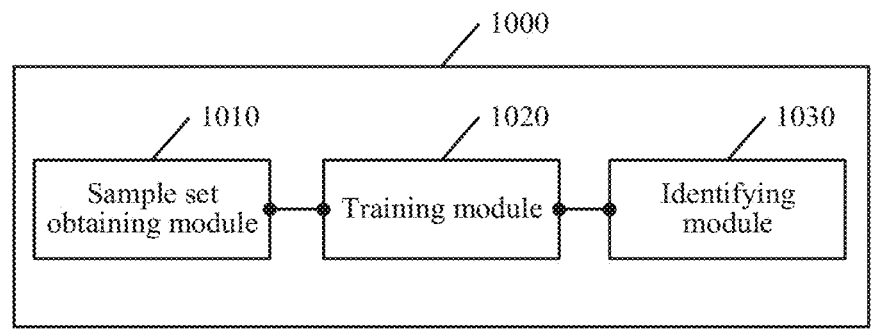
FIG. 10 is a schematic structural diagram of a face living body detection model training apparatus according to an embodiment of this application.

Next, referring to a schematic structural diagram of a face living body detection model training apparatus 1000 shown in FIG. 10, the apparatus 1000 includes:

a sample set obtaining module 1010, configured to obtain a training data set, each group of training data in the training data set including a sample difference image, a label tag of the sample difference image, and a depth map and a texture map corresponding to the sample difference image, the sample difference image being obtained by performing image difference on face images of a sample detection object acquired in different illumination conditions, the label tag of the sample difference image being used for identifying whether the sample detection object to which the sample difference image belongs is a living body, the depth map being used for identifying depth information of pixel positions in the sample difference image, the texture map being used for identifying material types of the pixel positions in the sample difference image, and the material types being determined based on texture information of the pixel positions;

a training module 1020, configured to train a preconstructed first neural network model according to the training data set to obtain a first neural network model in a converged state, the first neural network model including a convolution layer, two deconvolution layers, a global pooling layer, and a fully connected classification layer; and an identifying module 1030, configured to identify (e.g., crop) the first neural network model in a converged state to obtain a face living body detection model, the face living body detection model including the convolution layer, the global pooling layer, and the fully connected classification layer.

In some embodiments, the training module 1020 is specifically configured to:

input a sample difference image included in each group of training data in the training data set into the preconstructed first neural network model;

perform feature extraction on the sample difference image by using the convolution layer in the first neural network model to obtain a group of feature maps, and decouple the group of feature maps into a first group of feature maps and a second group of feature maps, the first group of feature maps representing an object normal vector of the sample detection object, and the second group of feature maps representing an object reflectivity of the sample detection object;

input the first group of feature maps into a first deconvolution layer in the first neural network model and input the second group of feature maps into a second deconvolution layer in the first neural network model by using the convolution layer in the first neural network model, and input the group of feature maps into the global pooling layer in the first neural network model to input the group of feature maps into the fully connected classification layer after being processed by the global pooling layer;

determine a depth map loss according to a predicted feature map outputted by the first deconvolution layer and the depth map corresponding to the sample difference image, determine a texture map loss according to a predicted feature map outputted by the second deconvolution layer and the texture map corresponding to the sample difference image, and determine a classification loss according to a predicted tag outputted by the fully connected classification layer and the label tag corresponding to the sample difference image; and determine a model loss according to the depth map loss, the texture map loss, and the classification loss determined in each iterative update cycle, and iteratively update a parameter of the first neural network model according to the model loss until the first neural network model is in a converged state.

In some embodiments, the sample set obtaining module 1010 is specifically configured to:

obtain a first training data set, a sample difference image included in each group of training data in the first training data set being obtained by performing image difference processing based on face central regions of two images corresponding to the sample detection object in different illumination conditions;

obtain a second training data set, a sample difference image included in each group of training data in the second training data set being obtained by performing image difference processing based on face local organ regions of two images corresponding to the sample detection object in different illumination conditions; and the training module 1020 is specifically configured to:

train a preconstructed first neural network model according to the first training data set and the second training data set in parallel, to obtain two first neural network models in a converged state.

In some embodiments, the training module 1020 is specifically configured to:

for the preconstructed first neural network model, train a network parameter of the first neural network model according to the training data set based on an end-to-end training manner until a first neural network model in a converged state is obtained.

In some embodiments, the training module 1020 is specifically configured to:

for the preconstructed first neural network model, in a first stage, fix the global pooling layer and the fully connected classification layer in the preconstructed first neural network model, and train the convolution layer and the two deconvolution layers based on the training data set;

in a second stage, fix the convolution layer and the deconvolution layers in the first neural network model, and train the global pooling layer and the fully connected classification layer based on the training data set; and obtain the first neural network model in a converged state after cross training of the first stage and the second stage.

In some embodiments, a network structure of the convolution layer adopts VGGNet, ResNet, or DenseNet; and a network structure of the deconvolution layer adopts UNet or Deconvolution with skip-connection.

Based on the implementations of the methods and the apparatuses provided in the embodiments of this application, this application further provides a device configured to implement face living body detection and a device configured to train a face living body detection model. The following describes the devices provided in the embodiments of this application from the perspective of hardware materialization.

Figure 11:
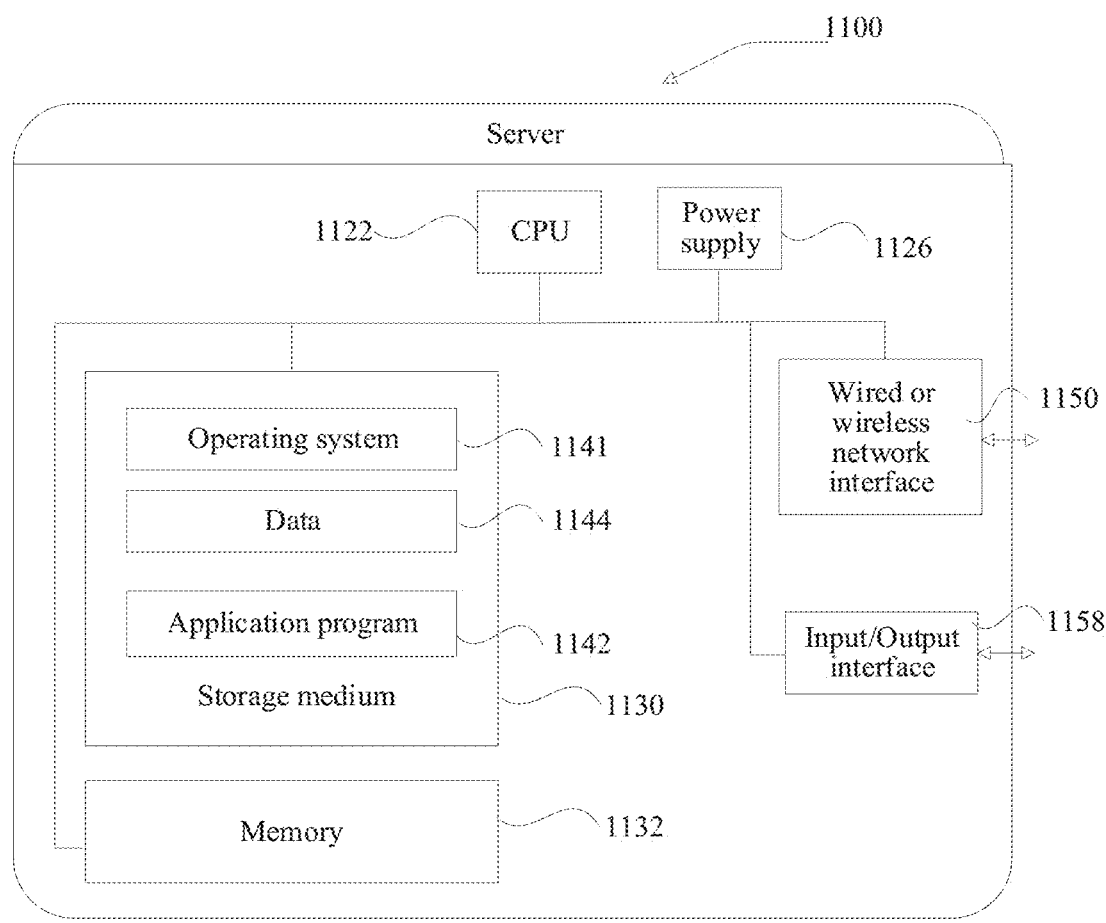
FIG. 11 is a schematic structural diagram of a server according to an embodiment of this application.

FIG. 11 is a schematic structural diagram of a device according to an embodiment of this application, and the device may be a server. The server 1100 may vary greatly due to different configurations or performance, and may include one or more central processing units (CPU) 1122 (for example, one or more processors) and a memory 1132, and one or more storage media 1130 (for example, one or more mass storage devices) that store an application program 1142 or data 1144. The memory 1132 and the storage medium 1130 may be transient or persistent storage. The program stored in the storage medium 1130 may include one or more modules (not shown in the figure), and each module may include a series of instruction operations for the server. Still further, the CPU 1122 may be configured to communicate with the storage medium 1130 to perform the series of instruction operations in the storage medium 1130 on the server 1100.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps performed by the server in the foregoing embodiment may be based on the server structure shown in FIG. 11.

When the device is configured to implement face living body detection, the CPU 1122 is configured to perform the following steps:

obtaining a first face image of a target detection object in a first illumination condition and a second face image of the target detection object in a second illumination condition;

determining a difference image according to the first face image and the second face image;

extracting a feature map from the difference image, and decoupling an object reflectivity corresponding to the target detection object and an object normal vector corresponding to the target detection object from the feature map, the object reflectivity being used for representing texture information, and the object normal vector being used for representing depth information; and determining whether the target detection object is a living body according to the object reflectivity and the object normal vector.

In some embodiments, the CPU 1122 is further configured to perform steps of any implementation of the face living body detection method provided in the embodiments of this application.

Certainly, when the device is configured to train a face living body detection model, the CPU 1122 is configured to perform the following steps:

obtaining a training data set, each group of training data in the training data set including a sample difference image, a label tag of the sample difference image, and a depth map and a texture map corresponding to the sample difference image, the sample difference image being obtained by performing image difference on face images of a sample detection object acquired in different illumination conditions, the label tag of the sample difference image being used for identifying whether the sample detection object to which the sample difference image belongs is a living body, the depth map being used for identifying depth information of pixel positions in the sample difference image, the texture map being used for identifying material types of the pixel positions in the sample difference image, and the material types being determined based on texture information of the pixel positions;

training a preconstructed first neural network model according to the training data set to obtain a first neural network model in a converged state, the first neural network model including a convolution layer, two deconvolution layers, a global pooling layer, and a fully connected classification layer; and identifying the first neural network model in a converged state to obtain a face living body detection model, the face living body detection model including the convolution layer, the global pooling layer, and the fully connected classification layer.

In some embodiments, the CPU 1122 is further configured to perform steps of any implementation of the face living body detection model training method provided in the embodiments of this application.

An embodiment of this application further provides a computer-readable storage medium, configured to store a computer program, the computer program being configured to perform any implementation in a face living body detection method or a face living body detection model training method described in the foregoing embodiments.

An embodiment of this application further provides a computer program product including instructions, the computer program product, when executed on a computer, causing the computer to perform the face living body detection method or the face living body detection model training method.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this application, it is to be understood that the disclosed system, apparatus, and method may be implemented in other manners. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. A face living body detection method performed by a computing device, the method comprising:
    obtaining a first face image of a target detection object in a first illumination condition and a second face image of the target detection object in a second illumination condition;
    determining a difference image according to the first face image and the second face image;
    extracting a feature map from the difference image, and decoupling an object reflectivity corresponding to the target detection object and an object normal vector corresponding to the target detection object from the feature map, the object reflectivity being used for representing texture information, and the object normal vector being used for representing depth information; and
    determining whether the target detection object is a living body according to the object reflectivity and the object normal vector.

2. The method according to claim 1, wherein the determining a difference image according to the first face image and the second face image comprises:
    identifying a face central region of the first face image to obtain a first face central region image, and identifying a face central region of the second face image to obtain a second face central region image; and
    performing image difference processing on the first face central region image and the second face central region image to obtain the difference image between the face central regions.

3. The method according to claim 1, wherein the determining a difference image according to the first face image and the second face image comprises:
    identifying a face local organ region of the first face image to obtain a first face local organ region image, and identifying a face local organ region of the second face image to obtain a second face local organ region image; and
    performing image difference processing on the first face local organ region image and the second face local organ region image to obtain the difference image between the face local organ regions.

4. The method according to claim 1, wherein the determining a difference image according to the first face image and the second face image comprises:
    identifying a face central region of the first face image to obtain a first face central region image, and identifying a face central region of the second face image to obtain a second face central region image;
    performing image difference processing on the first face central region image and the second face central region image to obtain a first difference image between the face central regions;
    identifying a face local organ region of the first face image to obtain a first face local organ region image, and identifying a face local organ region of the second face image to obtain a second face local organ region image; and
    performing image difference processing on the first face local organ region image and the second face local organ region image to obtain a second difference image between the face local organ regions.

5. The method according to claim 1, wherein the extracting a feature map from the difference image, and decoupling an object reflectivity corresponding to the target detection object and an object normal vector corresponding to the target detection object from the feature map; and determining whether the target detection object is a living body according to the object reflectivity and the object normal vector comprises:
    extracting a feature map from the difference image by using a pre-trained face living body detection model, and decoupling the object reflectivity corresponding to the target detection object and the object normal vector corresponding to the target detection object from the feature map; and determining, by using the face living body detection model, whether the target detection object is a living body according to the object reflectivity and the object normal vector.

6. The method according to claim 5, wherein the extracting a feature map from the difference image by using a pre-trained face living body detection model, and decoupling the object reflectivity corresponding to the target detection object and the object normal vector corresponding to the target detection object from the feature map; and determining, by using the face living body detection model, whether the target detection object is a living body according to the object reflectivity and the object normal vector comprises:
    inputting the difference image into the face living body detection model, obtaining the feature map by extracting an image feature by using a convolution layer in the face living body detection model, decoupling the object reflectivity corresponding to the target detection object and the object normal vector corresponding to the target detection object from the feature map, and determining, by using a global pooling layer and a fully connected classification layer in the face living body detection model, whether the target detection object is a living body according to the object reflectivity and the object normal vector.

7. The method according to claim 1, wherein the obtaining a first face image of a target detection object in a first illumination condition and a second face image of the target detection object in a second illumination condition comprises:
  generating an illumination instruction in response to a living body detection request, the illumination instruction comprising a first illumination parameter corresponding to the first illumination condition and a second illumination parameter corresponding to the second illumination condition; and
  controlling a light emitting component to emit light and acquiring facial reflected light of the target detection object based on the illumination instruction to sequentially form the first face image and the second face image.

8. The method according to claim 7, wherein the generating an illumination instruction in response to a living body detection request comprises:
  randomly selecting two different color identifiers in response to the living body detection request to generate an illumination instruction carrying the two different color identifiers.

9. The method according to claim 7, wherein the controlling a light emitting component to emit light and acquiring facial reflected light of the target detection object based on the illumination instruction to sequentially form the first face image and the second face image comprises:
  determining an angle of a face relative to an image acquisition region in response to the living body detection request;
  controlling, according to the illumination instruction and the angle, the light emitting component to emit light of the angle sequentially based on the first illumination parameter and the second illumination parameter; and
  acquiring the facial reflected light of the target detection object to sequentially form the first face image and the second face image.

10. A computing device, comprising:
  a processor and a memory,
  the memory being configured to store a plurality of computer programs, and
  the processor being configured to, when executing the plurality of computer programs, perform a plurality of operations including:
  obtaining a first face image of a target detection object in a first illumination condition and a second face image of the target detection object in a second illumination condition;
  determining a difference image according to the first face image and the second face image;
  extracting a feature map from the difference image, and decoupling an object reflectivity corresponding to the target detection object and an object normal vector corresponding to the target detection object from the feature map, the object reflectivity being used for representing texture information, and the object normal vector being used for representing depth information; and
  determining whether the target detection object is a living body according to the object reflectivity and the object normal vector.

11. The computing device according to claim 10, wherein the determining a difference image according to the first face image and the second face image comprises:
  identifying a face central region of the first face image to obtain a first face central region image, and identifying a face central region of the second face image to obtain a second face central region image; and
  performing image difference processing on the first face central region image and the second face central region image to obtain the difference image between the face central regions.

12. The computing device according to claim 10, wherein the determining a difference image according to the first face image and the second face image comprises:
  identifying a face local organ region of the first face image to obtain a first face local organ region image, and identifying a face local organ region of the second face image to obtain a second face local organ region image; and
  performing image difference processing on the first face local organ region image and the second face local organ region image to obtain the difference image between the face local organ regions.

13. The computing device according to claim 10, wherein the determining a difference image according to the first face image and the second face image comprises:
  identifying a face central region of the first face image to obtain a first face central region image, and identifying a face central region of the second face image to obtain a second face central region image;
  performing image difference processing on the first face central region image and the second face central region image to obtain a first difference image between the face central regions;
  identifying a face local organ region of the first face image to obtain a first face local organ region image, and identifying a face local organ region of the second face image to obtain a second face local organ region image; and
  performing image difference processing on the first face local organ region image and the second face local organ region image to obtain a second difference image between the face local organ regions.

14. The computing device according to claim 10, wherein the extracting a feature map from the difference image, and decoupling an object reflectivity corresponding to the target detection object and an object normal vector corresponding to the target detection object from the feature map; and determining whether the target detection object is a living body according to the object reflectivity and the object normal vector comprises:
  extracting a feature map from the difference image by using a pre-trained face living body detection model, and decoupling the object reflectivity corresponding to the target detection object and the object normal vector corresponding to the target detection object from the feature map; and determining, by using the face living body detection model, whether the target detection object is a living body according to the object reflectivity and the object normal vector.

15. The computing device according to claim 14, wherein the extracting a feature map from the difference image by using a pre-trained face living body detection model, and decoupling the object reflectivity corresponding to the target detection object and the object normal vector corresponding to the target detection object from the feature map; and determining, by using the face living body detection model, whether the target detection object is a living body according to the object reflectivity and the object normal vector comprises:
  inputting the difference image into the face living body detection model, obtaining the feature map by extracting an image feature by using a convolution layer in the face living body detection model, decoupling the object reflectivity corresponding to the target detection object and the object normal vector corresponding to the target detection object from the feature map, and determining, by using a global pooling layer and a fully connected classification layer in the face living body detection model, whether the target detection object is a living body according to the object reflectivity and the object normal vector.

16. The computing device according to claim 10, wherein the obtaining a first face image of a target detection object in a first illumination condition and a second face image of the target detection object in a second illumination condition comprises:
generating an illumination instruction in response to a living body detection request, the illumination instruction comprising a first illumination parameter corresponding to the first illumination condition and a second illumination parameter corresponding to the second illumination condition; and
controlling a light emitting component to emit light and acquiring facial reflected light of the target detection object based on the illumination instruction to sequentially form the first face image and the second face image.

17. The computing device according to claim 16, wherein the generating an illumination instruction in response to a living body detection request comprises:
randomly selecting two different color identifiers in response to the living body detection request to generate an illumination instruction carrying the two different color identifiers.

18. The computing device according to claim 16, wherein the controlling a light emitting component to emit light and acquiring facial reflected light of the target detection object based on the illumination instruction to sequentially form the first face image and the second face image comprises:
determining an angle of a face relative to an image acquisition region in response to the living body detection request;
controlling, according to the illumination instruction and the angle, the light emitting component to emit light of the angle sequentially based on the first illumination parameter and the second illumination parameter; and
acquiring the facial reflected light of the target detection object to sequentially form the first face image and the second face image.

19. A non-transitory computer-readable storage medium, configured to store a plurality of computer programs, the computer programs, when executed by a processor of a computing device, causing the computing device to perform a plurality of operations including:
obtaining a first face image of a target detection object in a first illumination condition and a second face image of the target detection object in a second illumination condition;
determining a difference image according to the first face image and the second face image;
extracting a feature map from the difference image, and decoupling an object reflectivity corresponding to the target detection object and an object normal vector corresponding to the target detection object from the feature map, the object reflectivity being used for representing texture information, and the object normal vector being used for representing depth information; and
determining whether the target detection object is a living body according to the object reflectivity and the object normal vector.

20. The non-transitory computer-readable storage medium according to claim 19, wherein the obtaining a first face image of a target detection object in a first illumination condition and a second face image of the target detection object in a second illumination condition comprises:
generating an illumination instruction in response to a living body detection request, the illumination instruction comprising a first illumination parameter corresponding to the first illumination condition and a second illumination parameter corresponding to the second illumination condition; and
controlling a light emitting component to emit light and acquiring facial reflected light of the target detection object based on the illumination instruction to sequentially form the first face image and the second face image.

* * * * *